(12) United States Patent
Albisetti (10) Patent No.: US 6,758,374 B2
(45) Date of Patent: Jul. 6, 2004

(54) PACKAGING AND DISPENSER DEVICE ENABLING VARIABLE QUANTITIES TO BE DISPENSED

(75) Inventor: Nicolas Albisetti, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/905,044

(22) Filed: Jul. 12, 2001

(65) Prior Publication Data
US 2002/0020716 A1 Feb. 21, 2002

(30) Foreign Application Priority Data
Jul. 17, 2000 (FR) .............................. 00 09352

(51) Int. Cl.⁷ .............................................. B65D 37/00
(52) U.S. Cl. ................ 222/209; 222/210; 222/212; 222/213; 222/434; 222/549
(58) Field of Search ................ 222/210, 212, 222/209, 207, 434, 519, 549, 213, 214

(56) References Cited

U.S. PATENT DOCUMENTS

| | | | |
|---|---|---|---|
| 2,738,107 A | * 3/1956 | Graham | 222/215 |
| 3,121,519 A | * 2/1964 | Cherba | 222/519 |
| 3,618,846 A | * 11/1971 | Poli | 228/52 |
| 3,938,514 A | * 2/1976 | Boucher | 604/28 |
| 4,146,154 A | * 3/1979 | Mastman | 222/109 |
| 4,411,656 A | * 10/1983 | Cornett, III | 604/212 |
| 4,568,004 A | * 2/1986 | Goncalves | 222/207 |
| 4,596,343 A | * 6/1986 | Ford, Jr. | 222/190 |
| 4,846,376 A | * 7/1989 | Palmer | 222/190 |
| 4,893,734 A | * 1/1990 | Chlystun | 222/153.02 |
| 4,966,312 A | * 10/1990 | Waring | 222/209 |
| 5,088,627 A | * 2/1992 | Musel | 222/145.5 |
| 5,186,563 A | * 2/1993 | Gebhard et al. | 401/153 |
| 5,261,571 A | 11/1993 | Goncalves | 222/214 |
| 5,301,802 A | 4/1994 | Nemeroff | 206/217 |
| 5,328,060 A | * 7/1994 | Kersten et al. | 222/209 |
| 5,383,579 A | * 1/1995 | Lanfranconi et al. | 222/129 |
| 5,860,569 A | 1/1999 | Gregoire | 222/129 |

FOREIGN PATENT DOCUMENTS

| | | |
|---|---|---|
| EP | 0 720 951 A1 | 7/1996 |
| EP | 0 899 203 A1 | 3/1999 |
| FR | 2 630 712 | 11/1989 |
| FR | 2 708 913 | 2/1995 |
| FR | 2 767 514 | 2/1999 |
| WO | WO 94/08889 | 4/1994 |

OTHER PUBLICATIONS

French Search Report dated Mar. 23, 2001 and referenced which are copied herein.

\* cited by examiner

Primary Examiner—Gene Mancene
Assistant Examiner—F Nicolas
(74) Attorney, Agent, or Firm—Hunton & Williams LLP (57) ABSTRACT

The invention relates to a packaging and dispensing device for applying a cosmetic and/or care product, in particular to the hair and/or the scalp, the device comprising a receptacle including a bellows having first and second regions that are moved towards each other when the bellows is compressed. On being compressed, the bellows enables a quantity of substance to be dispensed. The device also has an adjustment member for modifying the compression stroke of the bellows, and thus the quantity of substance that is dispensed. The device is arranged in such a manner that the bellows is compressed by thrust exerted by the user substantially on the axis of the bellows.

53 Claims, 10 Drawing Sheets

PACKAGING AND DISPENSER DEVICE ENABLING VARIABLE QUANTITIES TO BE DISPENSED

The present invention relates to devices for packaging and applying a substance, in particular a cosmetic and/or a care product, and it relates more particularly to devices for applying a substance to the hair and/or to the scalp.

BACKGROUND OF THE INVENTION

French patent application No. FR-A-2 684 569 discloses a packaging and dispenser device comprising a receptacle including a bellows and pushers movable relative to the receptacle, enabling the bellows to be compressed to cause a quantity of substance to be dispensed.

The user makes use of the thumb and the index finger to compress the bellows, by pressing against the pushers in a direction that extends transversely relative to the axis of the bellows.

The structure of that device is relatively complex because of the use of pushers.

In addition, when the device includes a dispenser endpiece with a break-off portion, the Applicant company has found that applying substance to the base of the hair, so that the endpiece comes into contact with the scalp, can be uncomfortable because the endpiece can have sharp edges once the break-off portion has been removed, and these can scratch the scalp or snag the hair.

It is also relatively difficult with such a device for the user to control accurately the distance between the endpiece and the scalp, or to follow a predetermined path, e.g. a parting formed in the hair.

OBJECTS AND SUMMARY OF THE INVENTION

An object of the present invention is to provide a packaging and dispenser device intended specifically for applying a cosmetic and/or care product, in particular to the hair and/or to the scalp, which device is of structure that is relatively simple and inexpensive, is easy to use, and makes it possible to vary the quantity of substance that is dispensed.

The packaging and dispenser device of the invention comprises a receptacle including a bellows enabling a quantity of substance to be dispensed by being compressed axially, the bellows comprising first and second regions that move towards each other while the bellows is being compressed, the device including an adjustment member for modifying the compression stroke of the bellows and thus the quantity of substance that is dispensed, the device being arranged in such a manner that compression of the bellows is the result of thrust exerted by the user substantially along the axis of the bellows.

Preferably, the adjustment member moves together with the first region during compression of the bellows, and includes a stop surface suitable for bearing against an abutment-forming surface that is stationary relative to the second region of the bellows, at least while the bellows is being compressed, thereby determining the maximum compression stroke of the bellows, the adjustment member being fixed on the device in such a manner that the axial position of said stop surface can be modified prior to compressing the bellows, depending on the quantity of substance that is to be dispensed.

By means of the invention, the user can easily and reproducibly select the quantity of substance that is to be dispensed, while still having a device that is relatively simple and inexpensive to manufacture.

The bellows preferably communicates with a flask body via a waisted portion.

Such a waisted portion makes the device easy to hold and, where the dispenser endpiece makes this possible, it enables the bellows to be compressed by exerting thrust with the thumb on one end of the bellows and with the middle and index fingers on the other end of the bellows, the middle and index fingers being engaged in the waist around the waisted portion.

Thus, the device preferably includes first and second bearing surfaces situated at respective ends of the bellows so as to enable the user to exert pressure along the axis of the receptacle to move said bearing surfaces towards each other and compress the bellows, the first bearing surface being situated on a dispenser endpiece or in the vicinity thereof so that the user can dispense the substance while holding the device in one hand and can simultaneously bring said hand into contact with the surface onto which the substance is to be applied.

Specifically, this configuration makes it easy for the user to use the hand to control the distance between the dispenser endpiece and the surface to be treated and to control the pressure with which the endpiece is applied against said surface.

The user can thus move the endpiece accurately along the surface to be treated without the endpiece coming into contact therewith, merely with the help of the hand, and preferably of the thumb.

The user can also dispense the substance into the other hand prior to applying it to the surface that is to be treated.

In addition, when using a break-off endpiece, the user can avoid contact between the endpiece and the surface to be treated.

The bellows is preferably made integrally with the flask body.

Also preferably, the axis of the bellows can coincided with the axis of the flask body.

The volume of the flask body can be at least ten times greater than the volume of the bellows when the bellows is in the non-compressed state.

The device can include means for fixing the adjustment member on the device to enable the maximum compression stroke of the bellows to be adjusted continuously.

These means can comprise a thread made on the neck of the receptacle or on a piece fitted thereto.

When a thread is used, the device preferably includes a band and the adjustment member includes at least one portion in relief suitable for going elastically past said band while the adjustment member is being screwed onto the receptacle, the band being shaped in such a manner as to prevent the adjustment member being fully unscrewed.

The device can also include a succession of portions in relief situated at different levels relative to the first region of the bellows, and the adjustment member can comprise at least one positioning element for co-operating with said portions in relief in order to prevent the adjustment member from moving axially when in a predetermined axial position relative to the first region of the bellows.

Such portions in relief can be constituted by a succession of ribs leaving grooves between them in which the positioning element can engage.

In a particular embodiment, each of the grooves extends over a limited angular sector about the axis of the receptacle, and the positioning element of the adjustment member extends over an angular sector selected in such a manner as to enable the positioning element to be disengaged from the grooves formed between said ribs by being turned about the axis of the receptacle so as to make it possible to modify the axial position of the adjustment member, and thus the quantity of substance that is dispensed when the bellows is compressed.

The portions in relief in question can be formed on a piece which is fitted to the receptacle.

In a variant, the portions in relief can be made while the receptacle is being molded.

In an embodiment of the invention, the abutment-forming surface is defined by a portion of the device.

In particular, the abutment-forming surface can be defined by a transverse wall of the receptacle.

The abutment-forming surface can be situated inside the receptacle.

Under such circumstances, in a particular embodiment, the adjustment member includes an extension extending inside the bellows, and suitable for bearing against said abutment-forming surface when the bellows is compressed.

Preferably, said extension is constituted by the bottom portion of an inner sealing skirt bearing in leakproof manner against a neck of the receptacle.

In particular, the abutment-forming surface can be defined by a transverse wall to which the bellows is connected.

In a particular embodiment of the invention, said abutment-forming surface is defined by a portion of the outside surface of the receptacle.

In another particular embodiment of the invention, the abutment-forming surface is defined by a fold of the bellows.

Under such circumstances, the bellows is advantageously elliptical in cross-section and the adjustment member comprises at least one portion in relief defining said stop surface that is suitable for coming into abutment against a fold of the bellows in a predetermined angular position of the adjustment member relative to the receptacle, and that is suitable for moving freely between the folds of the bellows in another predetermined angular position of the adjustment member relative to the receptacle.

In a particular embodiment, the adjustment member comprises a wall situated outside the receptacle, defining said stop surface.

Preferably, said wall is constituted by a tubular skirt of inside diameter greater than the diameter of the bellows when the bellows is in the compressed state, said skirt being suitable for coming to bear against a transverse wall of the receptacle to which the bellows is connected.

In a particular embodiment, the adjustment member is suitable for coupling on a portion of the receptacle in such a manner as to hold the bellows in the compressed state during storage, thereby facilitating packaging.

Preferably, the adjustment member has catches suitable for snap-fastening on said portion of the receptacle, thereby simplifying manufacture.

In a particular embodiment, the adjustment member is suitable for snap-fastening on a portion of the receptacle having a radially outer edge that is not circular, thereby enabling the adjustment member to disengage from said portion of the receptacle by turning the adjustment member relative to the receptacle.

The device preferably includes a dispenser endpiece carried by the adjustment member.

In which case, the adjustment member advantageously includes a passage enabling the substance contained in the receptacle to reach the dispenser endpiece.

The dispenser endpiece can be hinged to the adjustment member.

Under such circumstances, the adjustment member preferably comprises a peripheral wall serving to mask an outlet orifice for delivering the substance from the endpiece, whenever the endpiece is in a first position relative to the adjustment member, with the endpiece being capable of tilting so as to take up a second position in which the outlet orifice is no longer masked by the peripheral wall of the adjustment member, when the user presses on the endpiece.

In a variant embodiment, the dispenser endpiece is secured to a deformable wall enabling the dispenser endpiece to move axially relative to the adjustment member.

Preferably, the deformable wall is in the form of a stepped tube.

Also preferably, the endpiece drives a plug during its movement relative to the adjustment member, which plug is arranged to isolate the inside of the receptacle from the outside, when the device is not in use.

The invention also provides a packaging and dispenser device comprising both a receptacle including a bellows enabling a quantity of substance to be dispensed by being compressed axially, and an adjustment member for modifying the compression stroke of the bellows and thus the quantity of substance dispensed, the device further comprising a dispenser endpiece and first and second bearing surfaces situated at respective ends of the bellows so as to enable the user to exert pressure along the axis of the receptacle so as to move said bearing surfaces towards each other and compress the bellows, the dispenser endpiece having an outlet orifice situated close to the first bearing surface, on the side of the device.

The invention also provides a packaging and dispenser device comprising both a receptacle including a bellows enabling a quantity of substance to be dispensed by being compressed axially, and an adjustment member for continuously modifying the compression stroke of the bellows and thus the quantity of substance dispensed, the device being arranged in such a manner that the bellows is compressed by the user exerting axial thrust on the bellows.

The invention also provides a packaging and dispenser device comprising both a receptacle including a bellows enabling a quantity of substance to be dispensed by being compressed axially, and an adjustment member for modifying the compression stroke of the bellows and thus the quantity of substance dispensed, the device being arranged in such a manner that the bellows is compressed by axial thrust exerted by the user on the bellows, and the bellows communicates with a flask body via a waisted portion.

The invention also provides a packaging and dispenser device comprising both a receptacle including a bellows enabling a quantity of substance to be dispensed by being compressed axially, and an adjustment member for modifying the compression stroke of the bellows and thus the quantity of substance dispensed, the device being arranged in such a manner that the bellows is compressed by the user exerting thrust substantially along the axis of the bellows, and the device does not have a valve.

The invention also provides a packaging and dispenser device comprising both a receptacle including a bellows enabling a quantity of substance to be dispensed by being compressed axially, and an adjustment member for modifying the compression stroke of the bellows and thus the quantity of substance dispensed, the device being arranged in such a manner that the bellows is compressed by the user exerting thrust by means of the thumb.

BRIEF DESCRIPTION OF THE DRAWINGS

The invention will be better understood on reading the following detailed description of non-limiting embodiments, and on examining the accompanying drawings, in which.

MORE DETAILED DESCRIPTION

Figure 1:
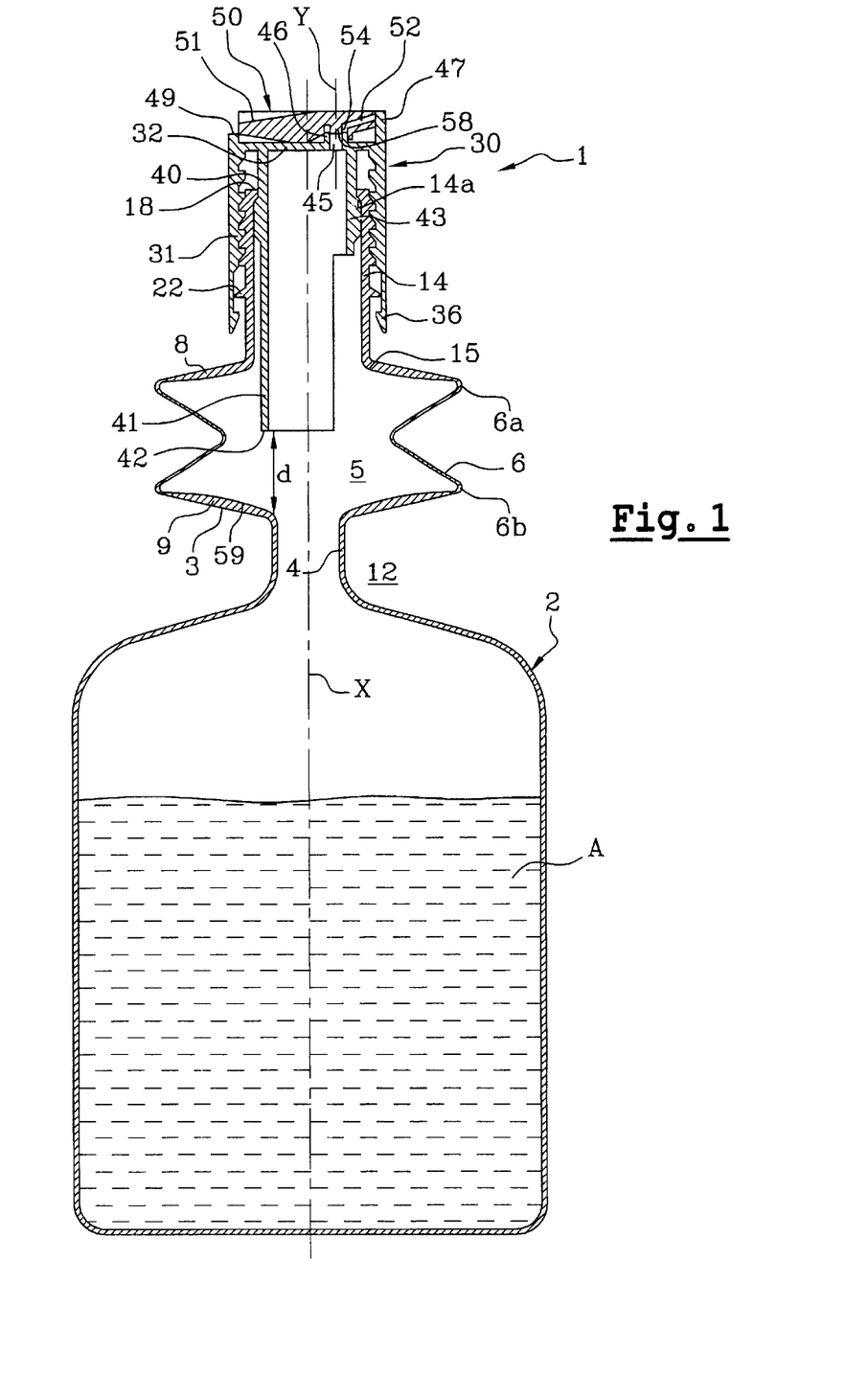
FIG. 1 is a diagrammatic axial section view of a device constituting a first embodiment of the invention.
Figure 2:
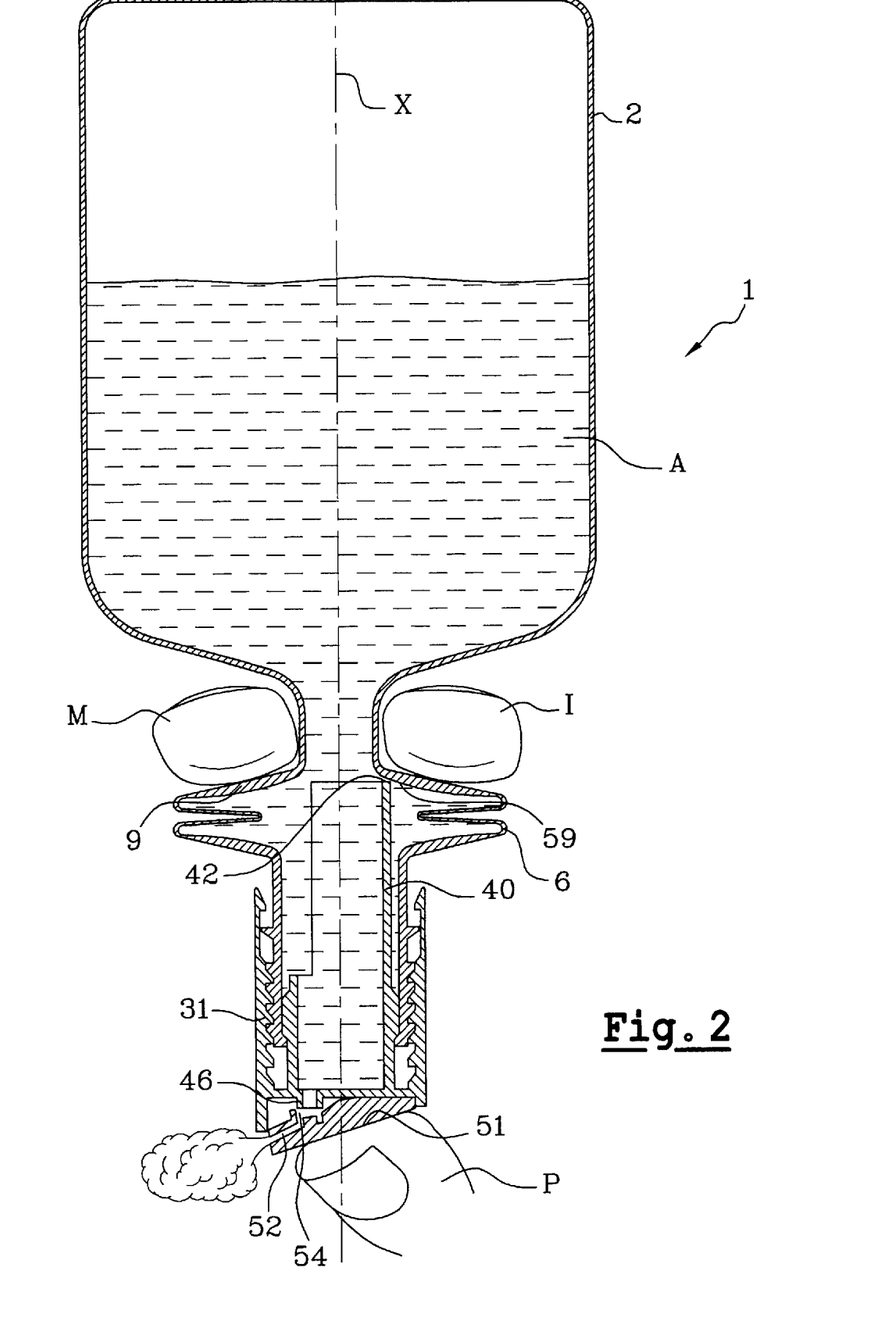
FIG. 2 is a view analogous to FIG. 1 showing the device in a head-down position, while in use.

The packaging and dispenser device 1 shown in FIGS. 1 and 2 comprises a receptacle whose bottom portion comprises a flask body 2 and whose top portion comprises a shape memory bellows 6 about an axis X, with a waisted portion 4 between them.

The bellows 6 defines an inside space 5 of variable volume, for dispensing a quantity of substance, as described in detail below.

The flask body 2 contains a substance A which can be a liquid of greater or smaller viscosity, or indeed a semiliquid.

In the embodiment described, the substance A is constituted by a shampoo or some other substance for use on the hair or the scalp.

The top of the bellows 6 is connected via a first region 6a to a transverse wall 8, which is extended upwards by a neck 14 about the axis X.

The bottom of the bellows 6 is connected via a second region 6b to a transverse wall 9 extending the waisted portion 5 upwards.

In the example described, the bellows 6 has one fold situated substantially halfway between the transverse walls 8 and 9.

The wall of the bellows 6 is of smaller thickness than the transverse walls 8 and 9.

Together with the transverse wall 9, the flask body 2 defines an annular waist 12 of the waisted portion 4 that is suitable for receiving the middle and index fingers M and I of the user, as shown in FIG. 2.

The bottom face of the transverse wall 9 then defines a bearing surface 3 for the middle and index fingers M and I of the user.

The neck 14 has an outside thread 19 extending substantially over half its length from its top end 18.

An annular band 22 whose function is described below is formed beneath the thread 19 on the outside surface of the neck 14.

The neck 14 has a circularly symmetrical inside surface about the axis X with a small inwardly-directed step 14a in the vicinity of its top end 18.

The device 1 has an adjustment member 30 screwed onto the neck 14.

The adjustment member 30 comprises an outer assembly skirt 31 and an inner skirt 40 which is engaged inside the neck 14, the two skirts 31 and 40 being coaxial and united at their top ends by a transverse wall 32.

The assembly skirt 31 has an inside thread over about two-thirds of its length from the transverse wall 32, and at its bottom end it has catches 36 on its radially inner surface that are shaped so as to be capable of going past the band 22 on the neck 14 by deforming elastically.

The catches 36 are defined in such a manner as to prevent the assembly skirt 31 being fully unscrewed, because the catches come into abutment against the bottom face of the band 22, substantially perpendicularly to the axis X.

The inner skirt 40 has an enlarged top portion 43 shaped so as to bear in leakproof manner against the inside surface of the neck 14 in the vicinity of the top end 18 thereof.

By screwing or unscrewing the adjustment member 30 on the neck 14, the inner skirt 40 is caused to move axially inside the neck.

The length of the top portion 43 is selected in such a manner as to remain in leakproof contact with the inside surface of the neck 14 over the entire adjustment stroke, regardless of whether the adjustment member 30 is fully screwed onto the neck 14 with the transverse wall 32 then bearing against the end 18 thereof, or whether it is unscrewed as far it will go, with the catches 36 coming into abutment against the band 22.

The inner skirt 40 is extended downwards beyond the enlarged top portion 43 by a bottom portion 41 of smaller diameter, with longitudinal openings therein, and having a bottom end 42 that defines a stop surface in the meaning of the invention.

When the bellows 6 is compressed, the inner skirt 40 comes to bear via its bottom end 42 against the transverse wall 9 whose top face 59 defines an abutment-forming surface in the meaning of the invention.

The transverse wall 32 has an off-center orifice 45 on an axis Y parallel to the axis X and surrounded by an upwardly-directed annular lip 46.

Above the transverse wall 32, the adjustment member 30 has a peripheral wall 47 defining a housing for receiving a dispenser endpiece 50.

On its side remote from the orifice 45, the peripheral wall 47 defines an opening 49 enabling the user to press on the endpiece 50, in a manner that is described in greater detail below.

In the embodiment described, the endpiece 50 is hinged to the adjustment member 30 about a pivot axis perpendicular to the axis X and perpendicular to the section plane of FIG. 1.

The endpiece 50 has a housing 54 in which the annular lip 46 engages, with the ability to move along the Y axis.

A closure stud 58 is formed in the end wall of the housing 54 to close the passage defined by the lip 46 in leakproof manner when the endpiece is in the closed position as shown in FIG. 1.

An outlet channel 52 is made through the endpiece 50 and communicates with the above-mentioned housing 54.

The outside end of this outlet channel 52 is masked by the peripheral wall 47 when the endpiece 50 is in its closed position.

The top face of the endpiece 50 defines a bearing surface 51 beside the opening 49 enabling the user to compress the bellows 6 with the thumb P, as shown in FIG. 2.

When the user exerts pressure on the bearing surface 51, the endpiece 50 begins by tilting, thereby enabling the outlet channel 52 to move away from the peripheral wall 47.

Thereafter, the bellows 6 deforms until the inner skirt 40 comes into abutment via its bottom end 42 against the transverse wall 9.

Prior to using the device 1, the user can adjust the distance d between the bottom end 42 of the inner skirt 40 and the transverse wall 9 by turning the adjustment member 30 to screw it to a greater or lesser extent on the neck 14.

The amount of substance that corresponds to the adjustment can be seen, for example, by means of graduations marked on the neck 14, the graduations being uncovered progressively as the adjustment member 30 is unscrewed, and thus as the compression stroke of the bellows 6 is increased.

When the bellows 6 is compressed, the inside volume of the receptacle is decreased and the air above the substance A is compressed, thereby causing substance to be expelled via the outlet channel 52.

Figure 3:
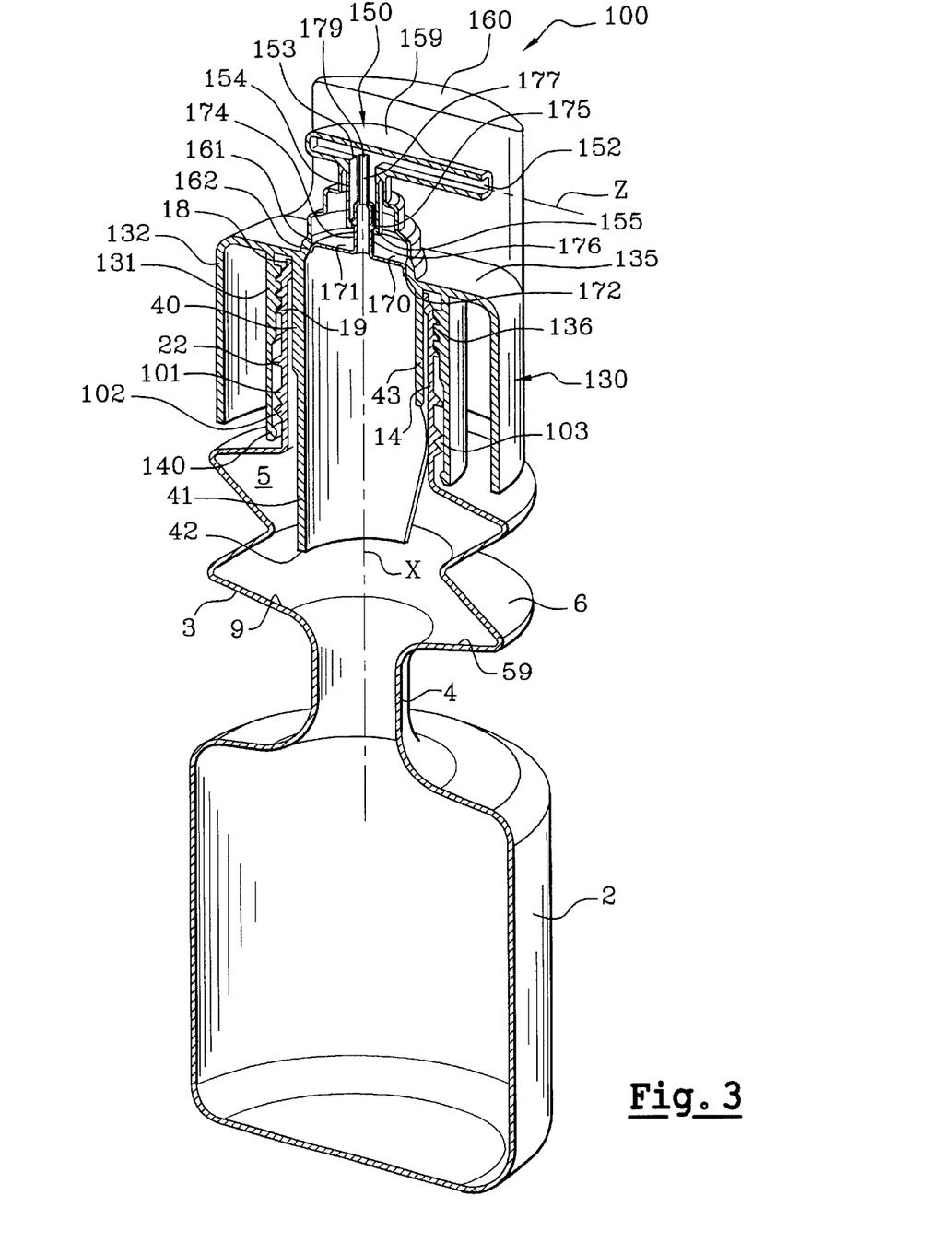
FIG. 3 is a diagrammatic fragmentary perspective view showing a device constituting a second embodiment of the invention.

FIG. 3 shows a device 100 comprising a receptacle that differs from that described above solely by the presence on the neck 14, beneath the annular band 22, of two beads 101 and 102 leaving an annular groove 103 between them for a purpose that is described below.

The device 100 has an adjustment member 130 with an inner skirt 40 identical to that described with reference to FIG. 1, an assembly skirt 131 outside the neck 14, and an outer, covering skirt 132.

The inner skirt 40, the assembly skirt 131, and the outer skirt 132 are united on top by a transverse wall 135.

The assembly skirt 131 has an inside thread 136 engaged on the thread 19 on the neck 14, and at its bottom end it has an annular band 140 suitable for deforming elastically to go past the band 22 and the beads 101 and 102.

As in the example described above, the band 22 prevents the adjustment member 130 being fully unscrewed, given the slope of its bottom face.

The beads 101 and 102 can be passed over by the band 140 in both directions and the band can be received in the annular groove 103.

The hard point associated with going past the bead 101 or 102 informs the user about the axial position of the adjustment member 130 relative to the neck 14.

The annular groove 103 corresponds to a predetermined axial position of the adjustment member 130 relative to the neck 14, e.g. for dispensing a medium-sized quantity.

Above the transverse wall 135, the adjustment member 130 has a dispenser endpiece 150 situated between two side extensions 160, only one of which can be seen in FIG. 3.

The dispenser endpiece 150 is connected to the transverse wall 135 via a stepped tubular wall 161.

This stepped tubular wall is connected to the transverse wall 135 via a frustoconical wall 162 which serves as a seat for a plug 170.

The endpiece 150 has an outlet channel 152 on an axis Z perpendicular to the axis X.

The spaces inside the stepped tubular wall 161 and the outlet channel 152 communicate via an orifice 153 on the X axis, thereby enabling the outlet channel 152 to be supplied with substance.

A plurality of coupling tabs 154 extend downwards around the orifice 153, each having a catch 155 at its bottom end on the radially inside face thereof.

The plug 170 comprises a disk 171 provided with a downwardly directed rim 172 and suitable for bearing in leakproof manner against the frustoconical wall 162, and also provided with a rod 174 extending upwards from the disk 171.

The rod 174 has an enlarged bottom portion 176 provided with an annular bead 175 suitable for snap-fastening between the tabs 154 above the catches 155, and above said enlarged portion 176 it has a top portion 177 of diameter that is considerably smaller than the diameter of the orifice 153, and extending to the vicinity of the top wall 159 of the endpiece 150.

At rest, i.e. in the configuration shown in FIG. 3, the stepped tubular wall 161 is fully deployed and the disk 171 bears via its rim 172 in leakproof manner against the frustoconical wall 162.

The inside of the receptacle is thus isolated from the outside.

The top wall 159 of the endpiece 150 defines a bearing surface for the user, and the level of this surface lies beneath the top ends of the side extensions 160, so that the endpiece 150 is protected against being pushed down accidentally.

The side extensions 160 also contribute to making it easier for the user to position a finger on the endpiece 150.

To dispense the substance, the user positions the device 100 in a head-down position and presses on the dispenser endpiece 150, thereby initially causing the stepped tubular wall 161 to deform given that in the embodiment described this wall is deformed on application of less force than is necessary for compressing the bellows 6.

During this deformation of the tubular wall 161, the top portion 177 comes to bear via its top end 179 against the top wall 159, thereby moving the plug 171 away from its seat and enabling the substance to reach the outlet channel 152.

Once the dispenser endpiece 150 has been fully pressed in, the pressure exerted thereon is transmitted to the adjustment member 30 and to the neck 14, so the bellows 6 is compressed until the bottom end 42 of the inner skirt 40 comes into abutment against the transverse wall 9, as in the preceding embodiment.

It will be understood that by placing a valve in the waisted portion 4, optionally together with a dip tube whose bottom end opens out into the bottom of the flask body 2, it is possible to pump substance into the inside space 5 each time the bellows expands.

Figure 4:
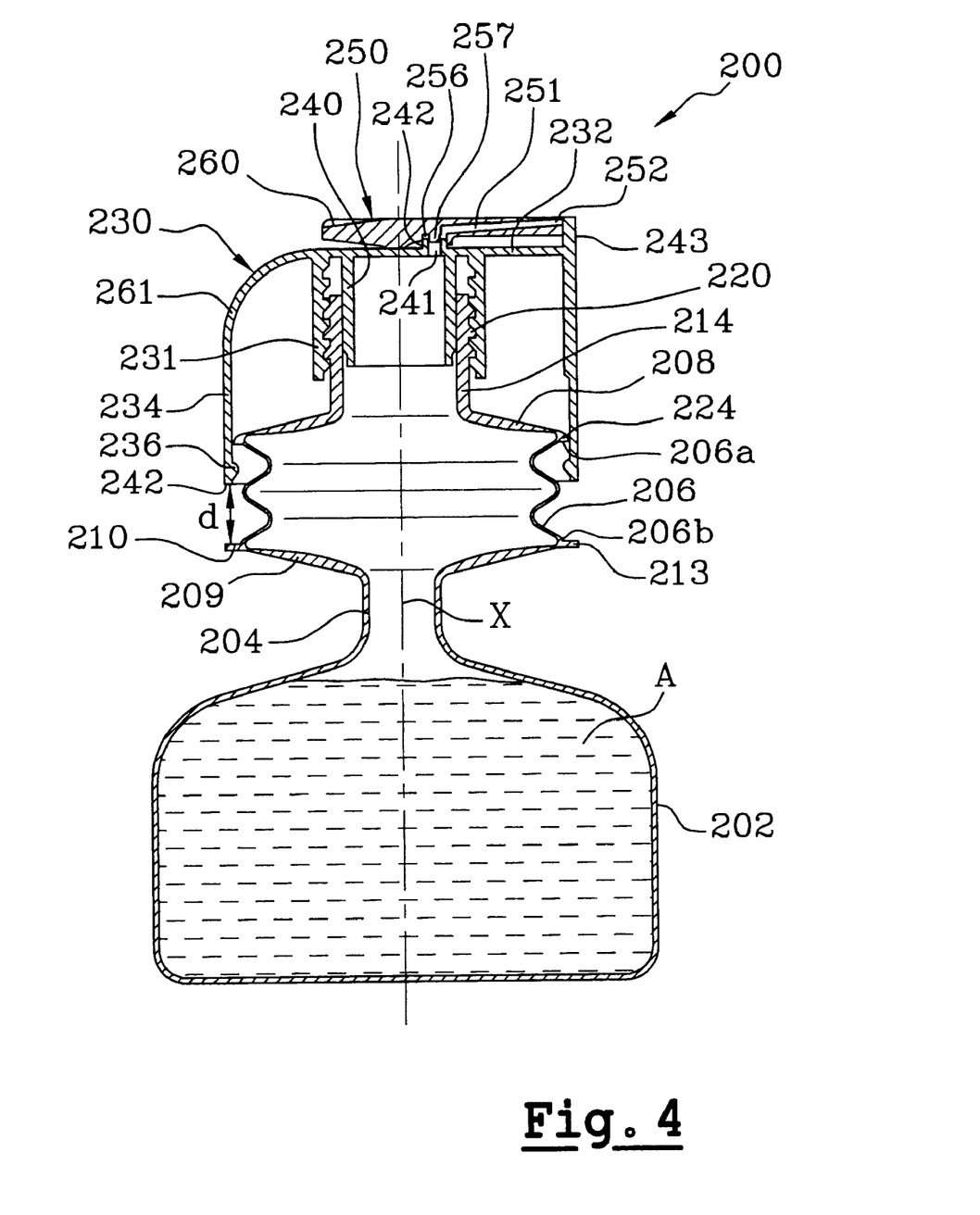
FIG. 4 is a diagrammatic axial section view of a device constituting a third embodiment of the invention.

FIG. 4 shows a device 200 comprising a receptacle with a bottom flask body 202 and a top bellows 206.

The receptacle also has a waisted portion 204 between the flask body 202 and the bellows 206, this waisted portion 204 being extended upwards by a transverse wall 209.

The top of the bellows 206 is connected via a first region 206a to a transverse wall 208, which is in turn extended upwards by a neck 214, the neck having an outside thread 220 on its top portion.

The bottom of the bellows 206 is connected via a second region 206b to the transverse wall 209, at a point that is set back slightly from the peripheral edge 213 so as to leave a collar 210 whose function is described below.

The device 200 has an adjustment member 230 comprising an outer skirt 234, the skirt surrounding an assembly skirt 231 having an inside thread screwed onto the neck 214.

The adjustment member 230 also has an inner skirt 230 suitable for bearing in leakproof manner against the inside surface of the neck 214.

The outer skirt 234 is provided at its bottom end and on its radially inside surface with catches 236.

The radially outer edge of the transverse wall 208 has an annular ridge 224 of outside diameter corresponding substantially to the inside diameter of the outer skirt 234, and shaped so as to be easy for the catches 236 to go past the ridge when the adjustment member 230 is screwed onto the neck 214, while having a bottom face that is substantially perpendicular to the X axis so as to prevent the adjustment member 230 being fully unscrewed.

The assembly skirt 231 and the inner skirt 240 are connected together by a transverse wall 232 having an orifice 241 passing therethrough.

The orifice is surrounded by an annular lip 242 which projects upwards from the transverse wall 232.

Above the transverse wall 232, the adjustment member 230 has a peripheral wall 243 defining a housing in which a dispenser endpiece 250 is received, the endpiece being hinged to the peripheral wall 243 about a pivot axis perpendicular to the X axis and perpendicular to plane of FIG. 4.

The endpiece 250 has an outlet channel 251 whose end 252 is situated in front of the peripheral wall 243 when the endpiece 250 is in its closed position, corresponding to FIG. 4.

The endpiece 250 has a housing 256 in which the annular lip 242 engages, which housing is provided with a closure stud 257 that closes the passage defined by the annular lip 242 when the endpiece 250 is in its closed position.

The peripheral wall 243 is perforated away from the end 252 so as to enable the user to press on a bearing surface 260 defined by the top face of the endpiece.

The outer skirt 234 is connected to the transverse wall 232 beside the bearing surface 260 via a rounded wall 261 which makes it more comfortable for the user to actuate the device.

The outer skirt 234 is suitable for bearing against the collar 210 via its own bottom end 242 when the bellows 206 is compressed axially.

By screwing the assembly skirt 231 to a greater or lesser extent onto the neck 214, it is possible to adjust the distance d which determines the maximum compression stroke of the bellows 206.

When the user presses on the dispenser endpiece 250, the endpiece pivots so as to bring the end 252 of the outlet channel above the peripheral wall 243, as in the embodiments of FIGS. 1 and 2 described above, and then the bellows 206 is compressed.

Figure 5:
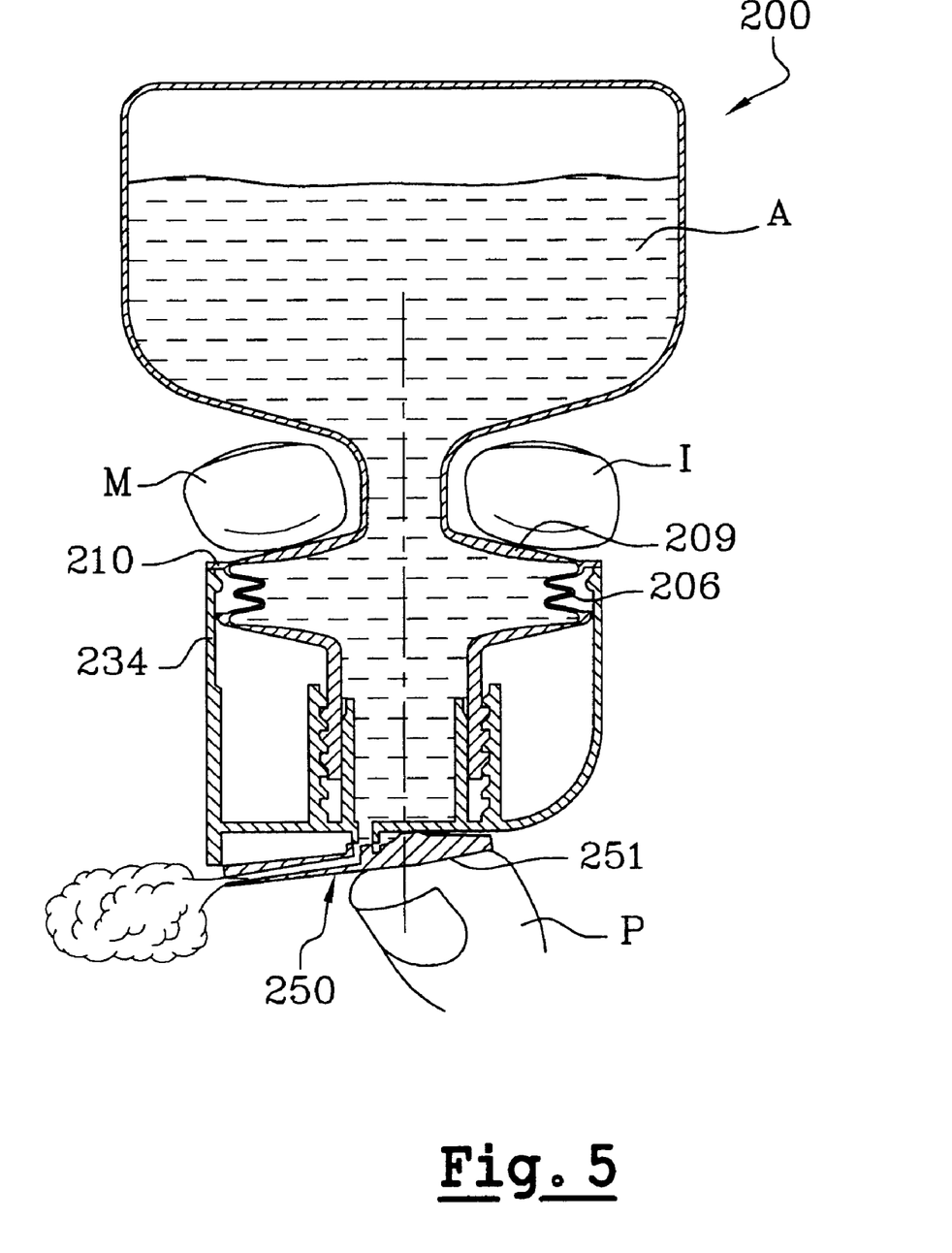
FIG. 5 is a view analogous to FIG. 4, showing the device in use.

FIG. 5 shows the device 200 when the outer skirt 234 has come into abutment against the collar 210 at the end of the bellows 206 being compressed.

Figure 6:
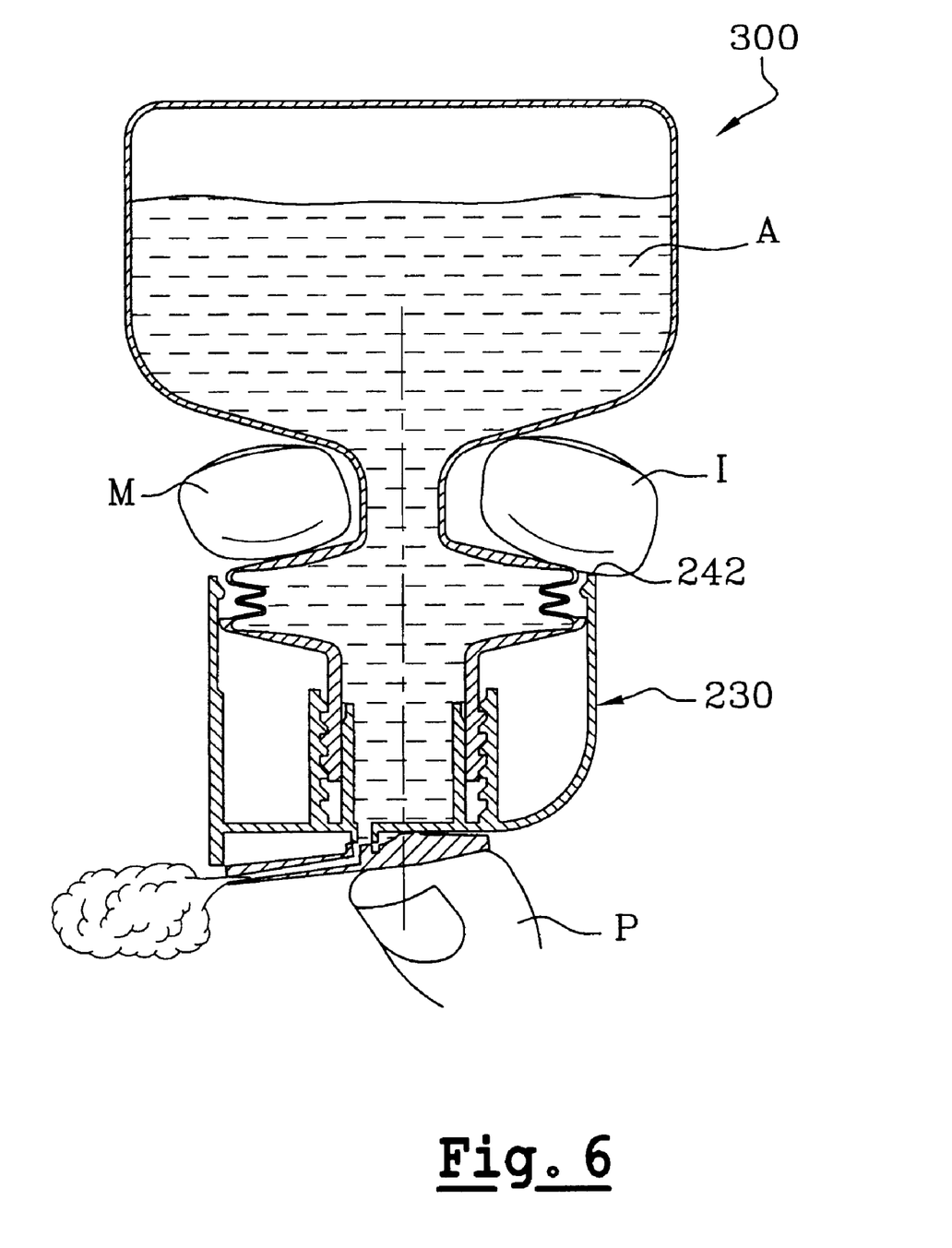
FIG. 6 is a view analogous to FIG. 5, showing a device constituting a fourth embodiment of the invention.

The device 300 shown in FIG. 6 differs from that described with reference to FIGS. 4 and 5 by the absence of the collar 210, with the abutment-forming surface in the meaning of the invention being defined by the fingers of the user.

Figures 7, 8:
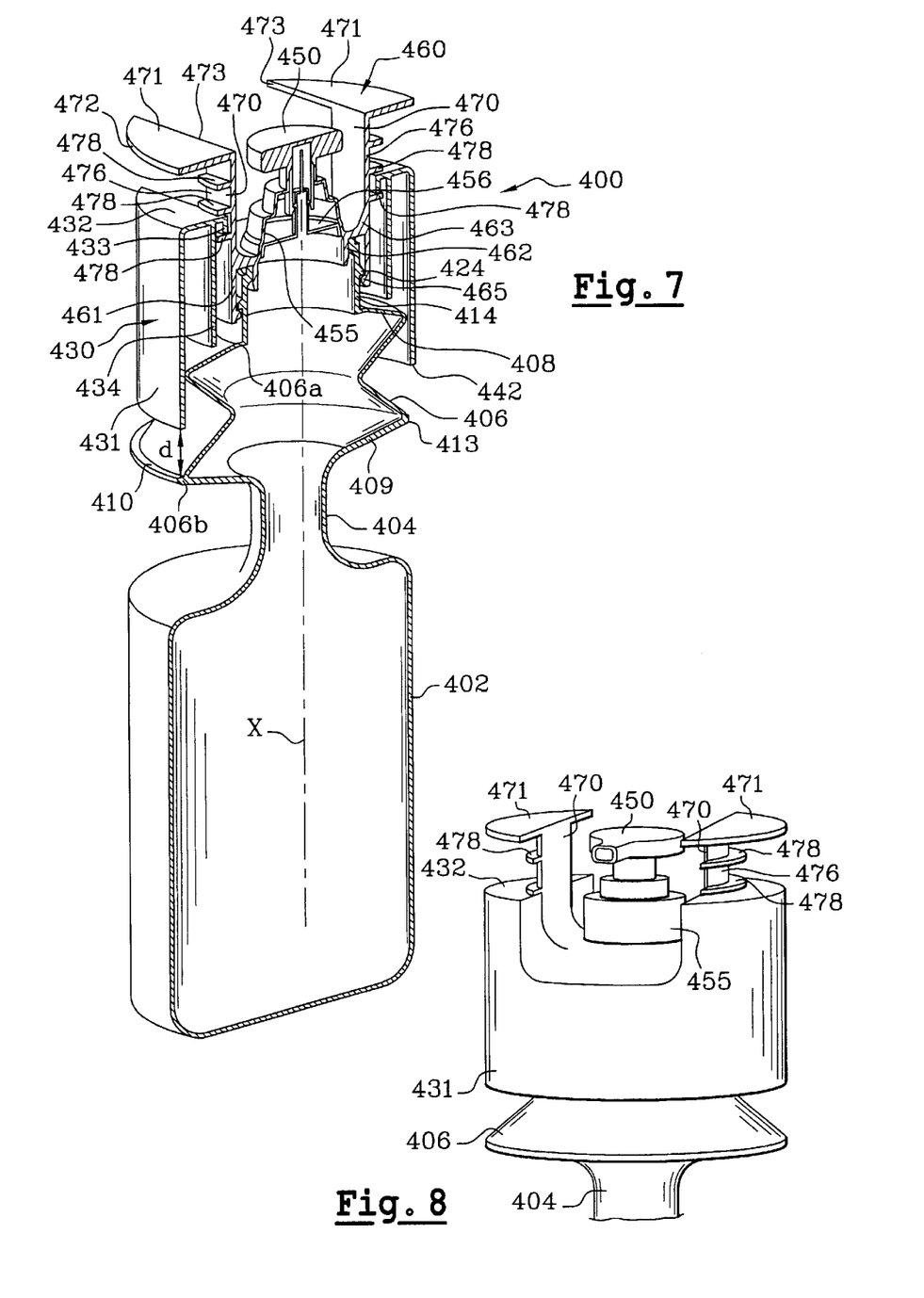
FIG. 7 is a partially cutaway diagrammatic fragmentary perspective view of a device constituting a fifth embodiment of the invention.
FIG. 8 is a diagrammatic perspective view of the top portion of the FIG. 7 device.

The device 400 shown in FIG. 7 comprises a receptacle about the axis X with both a bottom flask body 402 and a top bellows 406 connected to the flask body 402 via a waisted portion 404.

The waisted portion is extended upwards by a transverse wall 409.

The top of the bellows 406 is connected via a first region 406a to a transverse wall 408 which is in turn extended upwards by a neck 414 about the X axis.

The bellows 406 is connected to the transverse wall 409 by a second region 406b that is set back a little from the peripheral edge 413 of the wall 409 so as to form a collar 410, in the same manner as the device described with reference to FIGS. 4 and 5.

The neck 414 differs from those of the preceding embodiments by the fact that it does not have an outside thread, but merely has a single annular band 424.

The device 400 has an adjustment member 430 comprising an outer skirt 431 about the X axis that is suitable for bearing via its bottom end 442 against the collar 410 when the bellows 406 is compressed.

The top of the outer skirt 431 is connected to a transverse wall 432 whose inside has a downwardly-directed rim 433.

The adjustment member 430 has an inner skirt 434 whose top end is connected to the transverse wall 432 and that is of axial length that is shorter than that of the outer skirt 431 so as to ensure that it does not come to bear against the bellows 406.

The device 400 has a dispenser assembly 460 comprising an assembly skirt 461 provided with catches 465 suitable for snap-fastening on the band 424 of the neck 414, and an inner lip 462 suitable for bearing in leakproof manner against the radially inside surface of the neck 414.

The assembly skirt 461 and the inner lip 462 are connected together on top to an annular wall 463 which is in turn extended upwards and two diametrically opposite locations by side uprights 470 extending parallel to the X axis.

The uprights 470 are provided at their top ends with outwardly directed transverse fins 471 each having a radially outer edge 472 that is circular about the axis X, and of radius substantially equal to the radius of the outer skirt 431.

The fins 472 have rectilinear inside edges 473 that face each other, that are parallel, and that leave between them a gap enabling the user to press against the dispenser endpiece 450 situated between the uprights 470, as can be seen in FIG. 8.

The structure of the dispenser endpiece 450 is identical to that of the endpiece 150 described with reference to FIG. 3, and it is connected to the annular wall 463 via a stepped tubular wall 455 identical to the wall 161 described above.

A plug 456 is secured to the endpiece 450, said plug being identical to the above-described plug 171.

With the exception of the plug 456 which is fitted subsequently, the remainder of the dispenser assembly 460 is made as a single molding of thermoplastic material.

On their radially outer faces, the uprights 470 have a series of ribs 478 defining grooves 476 between one another that are situated at different levels along the X axis.

The height of each groove 476, i.e. the distance between two successive ribs 478, corresponds substantially to the height of the rims 433.

Each rim 433 occupies a limited angular sector so as to enable the adjustment member 430 to be decoupled axially from the dispenser assembly 460.

Thus, by turning the adjustment member 430 relative to the dispenser assembly 460, the user can bring the adjustment member into a position where the rims 433 lie outside the grooves 476, thereby enabling the adjustment member 430 to be moved axially relative to the dispenser assembly 460.

It will be observed that the inner skirt 434 is of an inside diameter that corresponds substantially to the outside diameter of the ribs 478.

The adjustment member 430 in this embodiment can be positioned at four different levels, with the bottom level being defined by the inner skirt 434 coming into abutment against the transverse wall 408.

Depending on the level that is selected, the distance d between the bottom end of the outer skirt 431 and the collar 410 is different, thus making it possible to expel a smaller or larger quantity of substance when the bellows 406 is compressed.

A device 500 is described below with reference to FIGS. 9 to 13, this device comprising a receptacle having a bottom flask body 502 and a top bellows 506 interconnected by a waisted portion 504.

Figure 9:
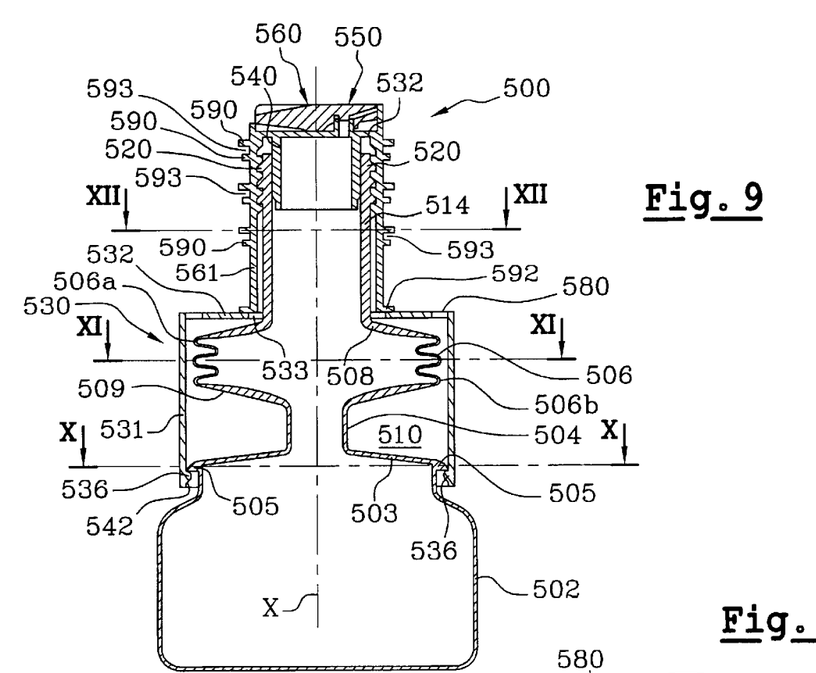
FIG. 9 is a diagrammatic axial section view of a device constituting a sixth embodiment of the invention.

The top of the bellows 506 is connected via a first region 506a to a transverse wall 508 which is extended upwards by a neck 514.

The bottom of the bellows 506 is connected via a second region 506b to a transverse wall 509 which extends the waisted portion 504 upwards.

The neck 514 has two outside threaded portions 520 that are diametrically opposite.

The flask body 502 has a transverse wall 503 in its top portion which co-operates with the transverse wall 509 to define an annular waist 510.

The periphery of the transverse wall 503 presents two diametrically opposite portions in relief 505 for a function that is described below.

Figures 10, 11:
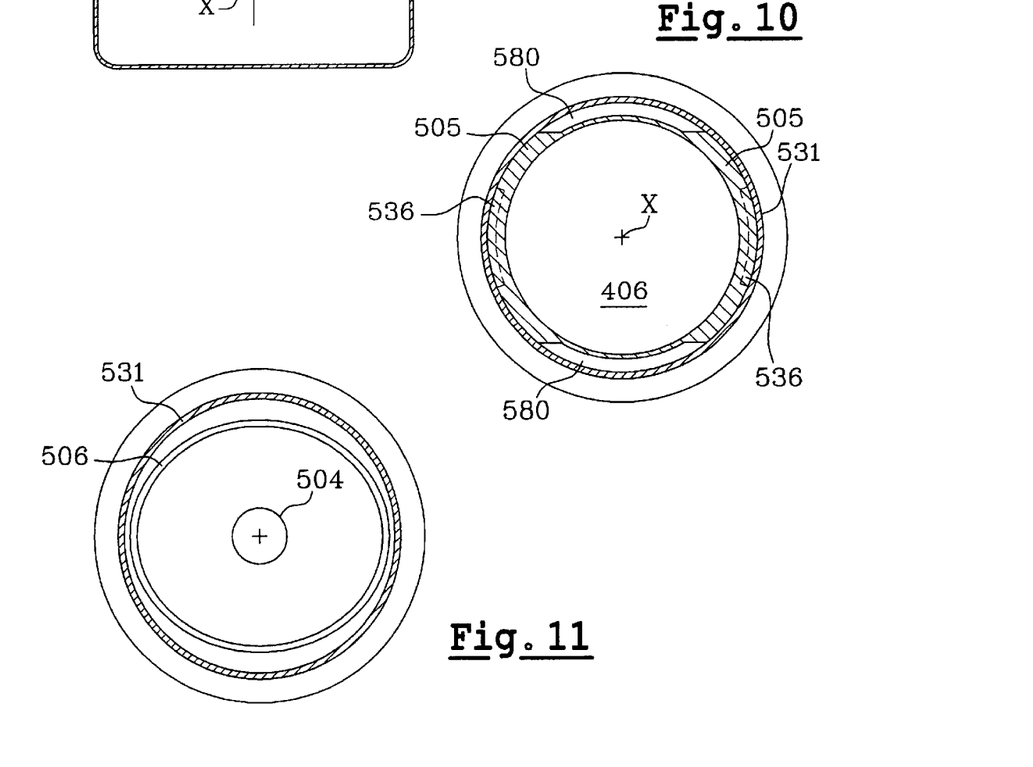
FIG. 10 is a cross-section view on section line X—X of FIG. 8.
FIG. 11 is a cross-section view on section line XI—XI of FIG. 8.

The cross-section of the bellows 506 is elliptical in shape, as can be seen in FIG. 10.

The device 500 has a dispenser assembly 560 comprising an assembly skirt 561 screwed onto the threaded portions 520 of the neck 514, and an inner skirt 540 bearing in leakproof manner against the radially inside surface of the neck 514.

The assembly skirt 561 and the inner skirt 540 are connected together on top via a transverse wall 532.

The dispenser assembly 560 receives a dispenser endpiece 550 identical to the dispenser endpiece described with reference to FIG. 1, the portion of the dispenser assembly 560 which extends above the transverse wall 532 being identical to that of the adjustment member 30 which extends above the transverse wall 32.

The device 500 has an adjustment member 530 comprising a skirt 531 which is circularly cylindrical about the X axis, being connected at its top end to a transverse wall 532 having a central opening 533 whose inside diameter corresponds to the outside diameter of the assembly skirt 561.

Two catches 536 are formed on the radially inside surface of the skirt 531 close to its bottom end, at locations that are diametrically opposite.

Figure 12:
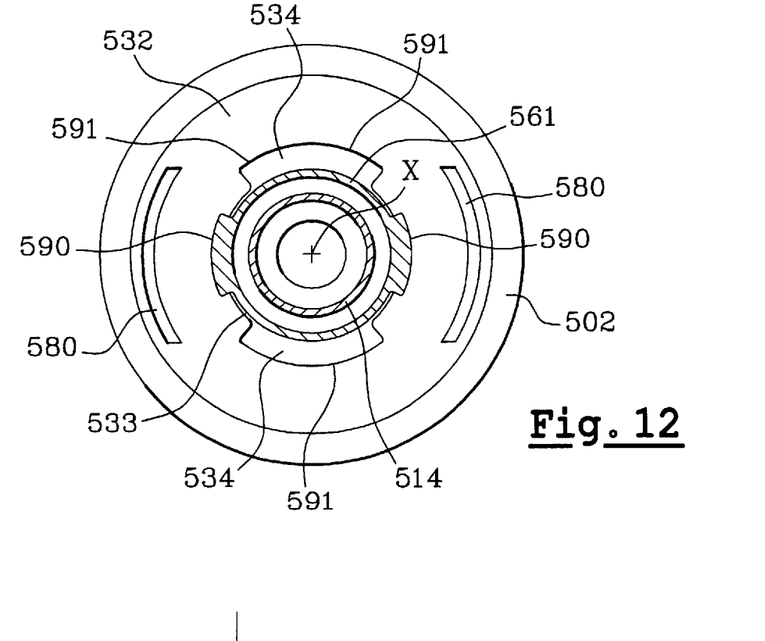
FIG. 12 is a cross-section view on section line XII—XII of FIG. 8.

As can be seen in FIG. 12, the transverse wall 532 has notches 534 looking to the central opening 533 so as to enable the threaded portions 520 to pass through when the adjustment member 530 is put into place on the neck 514.

The portions in relief 505 extend over limited angular sectors about the X axis and, as can be seen in FIG. 10, they leave gaps 580 between them of angular width greater than the angular width of the catches 536.

Depending on the angular position of the adjustment member 530 relative to the flask body 502, the catches 536 engage or do not engage with the portions in relief 505.

Thus, the device 500 can be maintained in a storage configuration in which the bellows 506 is compressed and the catches 536 bear against the undersides of the portions in relief 505, as shown in FIG. 9.

The size of the device is thus reduced, thereby making it easier to package.

Figure 13:
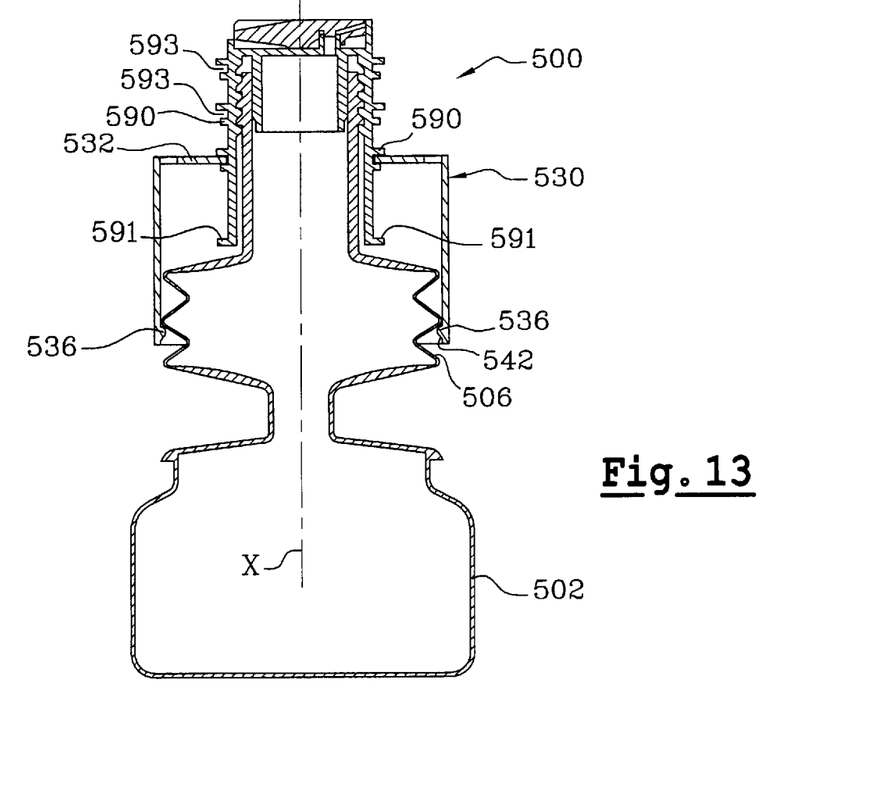
FIG. 13 shows the FIG. 8 device after the position of the adjustment member has been modified.

Because of the elliptical shape of the bellows 506, it is possible for the catches 536 to engage or not engage between the folds of the bellows 506, as shown in FIG. 13, depending on the angular position of the adjustment member 530 relative to the receptacle.

When the adjustment member 530 is turned through one-fourth of a turn about the position shown in FIG. 13, the catches 536 come into alignment with the minor axis of the elliptical section, which axis is short enough to allow the catches 536 to disengage from the bellows 506, thus leaving the skirt 531 free to move relative to the receptacle.

The transverse wall 532 has openings 580 for use when molding the catches 536.

On its outside surface, the assembly skirt 561 has a succession of diametrically opposite ribs 590, including two ribs 592 at its bottom end.

The ribs 590 situated on any one side are grouped together in pairs so as to form between them three grooves 593 that are equidistant along the X axis.

The width of each of these grooves 593 is very slightly greater than the thickness of the transverse wall 532.

The angular extent of the ribs 590 and 592 is less than that of the notches 534.

The diameter of the radially outer edges 591 of the notches 534 is greater than that of the ribs 590 or 592.

In the configuration of FIGS. 9 and 13, the adjustment member 530 is in a position in which the notches 534 are offset by one-fourth of a turn relative to the ribs 590 or 592.

In the storage configuration of FIG. 8, the bellows 506 is prevented from expanding by the catches 536 bearing against the portions in relief 505.

The adjustment member 530 can be moved into this position by snap-fastening the catches 536 on the portions in relief 505, which makes automatic manufacture easier.

To dispense substance, the user turns the adjustment member 530 through one-fourth of a turn about the receptacle, thus bringing the ribs 592 into register with the notches 534.

The user can then move the adjustment member 530 upwards so as to bring the transverse wall 532 level with one of the pairs of grooves 593, e.g. the lowest pair.

Thereafter, the user turns the adjustment member 530 against through one-fourth of a turn so as to enable the regions of the transverse wall 532 situated between the notches 534 to engage in the grooves 593, as shown in FIG. 13.

The catches 536 are then received between two folds of the bellows 506.

Depending on the level of the grooves 593 receiving the transverse wall 532, the bellows 506 has different maximum compression strokes, with the bottom faces 542 of the catches 536 defining stop surfaces in the meaning of the invention.

Figure 14:
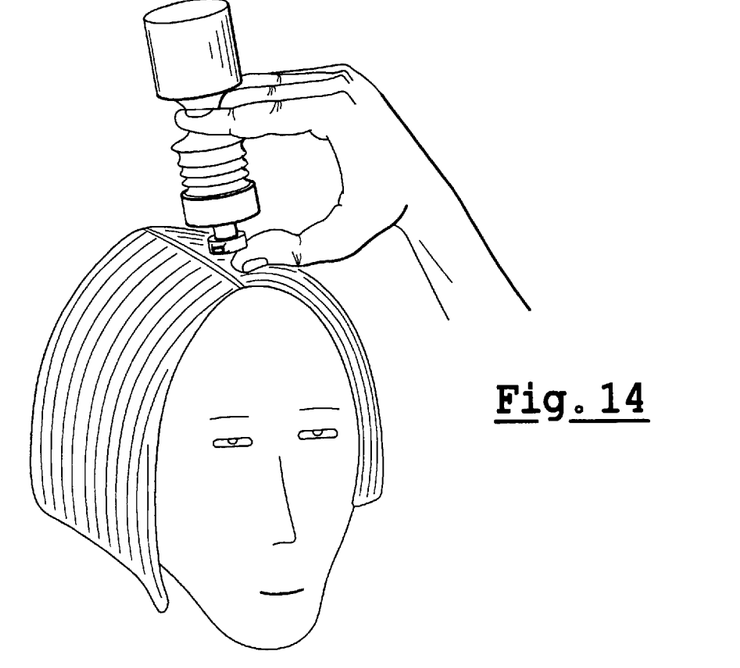
FIGS. 14 and 15 show how the FIG. 4 device is used for applying substance to the hair.
Figure 15:
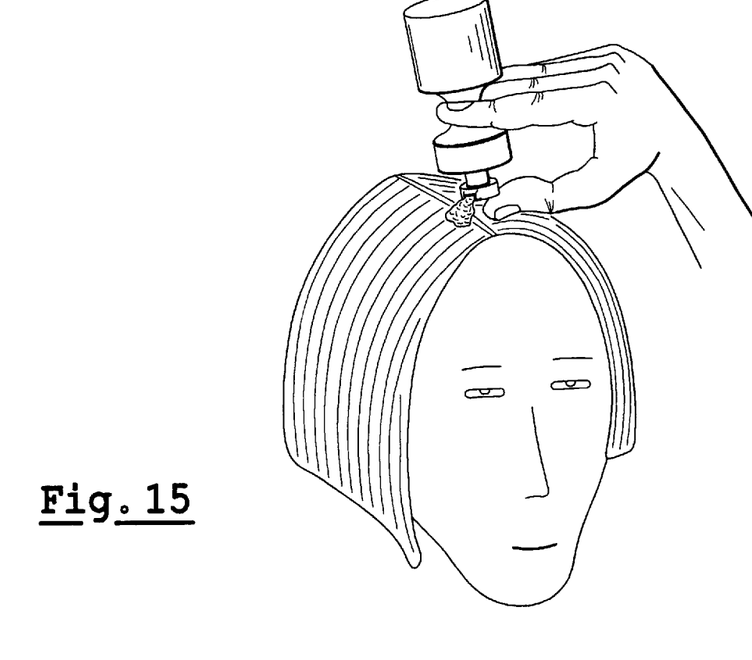

FIGS. 14 and 15 show the device 200 of FIG. 4 in use for applying a substance to the hair.

Because of the way the index and middle fingers are engaged in the waist constituting the waisted portion of the receptacle, it is possible to use the thumb that presses against the dispenser endpiece also to guide the dispenser endpiece in contact with the scalp, thus making it easier to follow a parting formed in the hair.

Naturally, the invention is not limited to the embodiments described above.

Advantage can be taken of the presence of the waisted portion to place a removable plug inside the receptacle, with the plug making it possible to store two components separately, and being moved on first use by any conventional means so as to enable the two components to be mixed together.

It is also possible to provide the device with a break-off dispenser endpiece.

What is claimed is:

1. A packaging and dispenser device configured for applying at least one of a cosmetic and a care substance, the device comprising both:
   a receptacle including a bellows capable of being compressed by thrust exerted by a user substantially along an axis of the bellows, the bellows having first and second regions that move towards each other during compression of the bellows, the bellows enabling a quantity of substance to be dispensed by being compressed axially, and
   an adjustment member for adjusting a compression stroke of the bellows and thus the quantity of substance that is dispensed, the adjustment member comprising a stop surface, and the adjustment member being fixed on the device in such a manner that the axial position of said stop surface can be modified prior to compressing the bellows.

2. A device according to claim 1, wherein the adjustment member moves together with the first region during compression of the bellows, and includes a stop surface suitable for bearing against an abutment-forming surface that is stationary relative to the second region of the bellows, at least while the bellows is being compressed, thereby determining a maximum compression stroke of the bellows, the adjustment member being fixed on the device in such a manner that the axial position of said stop surface can be modified prior to compressing the bellows, depending on the quantity of substance that is to be dispensed.

3. A device according to claim 1, including a dispenser endpiece and first and second bearing surfaces situated respectively at opposite ends of the bellows as to enable the user to exert pressure along an axis of the receptacle so as to bring said bearing surfaces towards each other and compress the bellows, the first bearing surface being situated on the dispenser endpiece or in a vicinity thereof, so that the user can dispense the substance while holding the device in one hand and while also bringing said hand into contact with the surface onto which the substance is to be applied.

4. A device according to claim 1, wherein the bellows communicates with a flask body via a waisted portion.

5. A device according to claim 4, wherein the bellows is integral with the flask body.

6. A device according to claim 1, wherein the axis of the bellows coincides with the axis of the flask body.

7. A device according to claim 1, wherein a volume of the flask body is at least ten times greater than a volume of the bellows when the bellows is in its non-compressed state.

8. A device according to claim 1, including fixing means for fixing the adjustment member on the device so as to enable a maximum compression stroke of the bellows to be adjusted continuously.

9. A device according to claim 8, wherein said fixing means include a thread.

10. A device according to claim 1, wherein the receptacle has a thread and wherein the adjustment member is screwed onto said thread.

11. A device according to claim 10, wherein the thread is made on a neck of the receptacle.

12. A device according to claim 8, including a projection, and wherein the adjustment member comprises at least one portion in relief suitable for passing resiliently over said projection when the adjustment member is screwed onto the receptacle, the projection being shaped in such a manner as to prevent the adjustment member from being unscrewed fully.

13. A device according to claim 1, including a dispenser endpiece carried by the adjustment member.

14. A device according to claim 13 wherein the adjustment member has a passage enabling the substance contained in the receptacle to reach the dispenser endpiece.

15. A device according to claim 13, wherein the dispenser endpiece is hinged on the adjustment member.

16. A device according to claim 15, wherein the adjustment member has a peripheral wall enabling a substance outlet orifice of the endpiece to be masked when the endpiece is in a first position relative to the adjustment member, the endpiece being capable of tilting when the user presses on the endpiece, thereby taking up a second position in which the outlet orifice is no longer masked by the peripheral wall of the adjustment member.

17. The method of using the device of claim 1, comprising dispensing a substance from the device of claim 1 in a head-down position, wherein the substance is for application to hair.

18. A device according to claim 1, wherein it is configured for applying a substance on the hair.

19. A device according to claim 1, wherein it is configured for applying a substance on a scalp.

20. A device according to claim 10, wherein the thread is made on a piece which is fitted to the receptacle.

21. A device according to claim 2, the device having a succession of portions in relief situated at different levels relative to the first region of the bellows, and the adjustment member having at least one positioning element suitable for co-operating with said portions in relief to prevent the adjustment member from moving axially when it is in a predetermined axial position relative to the first region of the bellows.

22. A device according to claim 21, wherein said portions in relief are constituted by a succession of ribs leaving grooves between one another, which grooves are suitable for receiving the positioning element.

23. A device according to claim 22, wherein each of said grooves extends over a limited angular sector about the axis of the receptacle, and wherein the positioning element of the adjustment member extends over an angular sector selected in such a manner as to enable the positioning element to be disengaged from the grooves formed between said ribs by being turned about the axis of the receptacle so as to make it possible to modify the axial position of the adjustment member and thus the quantity of substance that is dispensed when the bellows is compressed.

24. A device according to claim 21, wherein said portions in relief are formed on a piece which is fitted to the receptacle.

25. A device according to claim 21, wherein the portions in relief are made while the receptacle is being molded.

26. A device according to claim 2, wherein said abutment-forming surface is defined by a portion of the outside surface of the receptacle.

27. A device according to claim 26, wherein said abutment-forming surface is defined by a fold of the bellows.

28. A device according to claim 27, wherein the bellows is of elliptical cross-section, and wherein the adjustment member has at least one portion in relief defining said stop surface, suitable for coming to bear against a fold of the bellows in a predetermined angular position of the adjustment member relative to the receptacle, and suitable for moving freely between the folds of the bellows in another predetermined angular position of the adjustment member relative to the receptacle.

29. A device according to claim 26, wherein the adjustment member has a wall situated outside the receptacle and defining said stop surface.

30. A device according to claim 29, wherein said wall is constituted by a tubular skirt of inside diameter greater than the diameter of the bellows when the bellows is in the compressed state, said skirt being suitable for bearing against a transverse wall of the receptacle to which the bellows is connected.

31. A device according to claim 1, wherein the adjustment member is suitable for coupling on a portion of the receptacle in such a manner as to hold the bellows in the compressed state during storage.

32. A device according to claim 31, wherein the adjustment member has catches suitable for snap-fastening on said portion of the receptacle.

33. A device according to claim 32, wherein the adjustment member is suitable for snap-fastening on a portion of the receptacle having a radially outer edge that is not circular, so as to enable the adjustment member to be disengaged from said portion of the receptacle when the adjustment member is turned relative to the receptacle.

34. A device according to claim 13, wherein the dispenser endpiece is secured to a deformable wall enabling the dispenser endpiece to move axially relative to the adjustment member.

35. A device according to claim 34, wherein said deformable wall is in the form of a stepped tube.

36. A device according to claim 34, wherein the endpiece, when moving relative to the adjustment member, entrains a plug arranged to isolate the inside of the receptacle from the outside when the device is not in use.

37. A packaging and dispenser device comprising:
a receptacle including a bellows enabling a quantity of substance to be dispensed by being compressed axially, and
an adjustment member for adjusting a compression stroke of the bellows and thus the quantity of substance dispensed, the adjustment member comprising a stop surface, and the adjustment member being fixed on the device in such a manner that the axial position of said stop surface can be modified prior to compressing the bellows,
a dispenser endpiece and
first and second bearing surfaces situated at a respective ends of the bellows so as to enable a user to exert pressure along an axis of the receptacle so as to move said bearing surfaces towards each other and compress the bellows, the dispenser endpiece comprising an outlet orifice situated close to the first bearing surface, on a side of the device.

38. A packaging and dispenser device comprising both a receptacle including a bellows enabling a quantity of substance to be dispensed by being compressed axially, the bellows being compressed by a user exerting axial thrust on the bellows, and
an adjustment member for continuously modifying a compression stroke of the bellows and thus the quantity of substance dispensed, the adjustment member comprising a stop surface, and the adjustment member being fixed on the device in such a manner that the axial position of said stop surface can be modified prior to compressing the bellows.

39. A packaging and dispenser device comprising:
a receptacle including a bellows enabling a quantity of substance to be dispensed by being compressed axially, compressed by axial thrust exerted by a user on the bellows, and the bellows communicating with a flask body via a waisted portion and
an adjustment member for adjusting a compression stroke of the bellows and thus the quantity of substance dispensed, the adjustment member comprising a stop surface, and the adjustment member being fixed on the device in such a manner that the axial position of said stop surface can be modified prior to compressing the bellows.

40. A packaging and dispenser device comprising:
a receptacle including a bellows enabling a quantity of substance to be dispensed by being compressed axially, the bellows being compressible by a user exerting thrust substantially along an axis of the bellows, and
an adjustment member for adjusting a compression stroke of the bellows and thus the quantity of substance dispensed, the device comprising no valve, the adjustment member comprising a stop surface, and the adjustment member being fixed on the device in such a manner that the axial position of said stop surface can be modified prior to compressing the bellows.

41. A packaging and dispenser device comprising:
a receptacle including a bellows enabling a quantity of substance to be dispensed by being compressed axially, the bellows being compressed by a user exerting thrust by means of a thumb, and
an adjustment member for adjusting a compression stroke of the bellows and thus the quantity of substance dispensed, the adjustment member comprising a stop surface, and the adjustment member being fixed on the device in such a manner that the axial position of said stop surface can be modified prior to compressing the bellows.

42. A packaging and dispenser device configured for applying at least one of a cosmetic and a care substance, the device comprising:
a receptacle including a bellows capable of being compressed by thrust exerted by a user substantially along an axis of the bellows to dispense a quantity of substance, and
an adjustment member for adjusting a compression stroke of the bellows, the adjustment member being adjustable relative to the receptacle independently of the compression state of the bellows.

43. A packaging and dispenser device, configured for dispensing at least one of a cosmetic and a care substance, the device comprising:

a bellows capable of being compressed by thrust exerted by a user substantially along an axis of the bellows, the bellows having first and second regions that move towards each other during compression of the bellows, the bellows enabling a quantity of substance to be dispensed by being compressed axially, and an adjustment member for adjusting a compression stroke of the bellows, the adjustment member moving together with the first region during compression of the bellows, the adjustment member including a stop surface suitable for bearing against an abutment-forming surface that is stationary relative to the second region of the bellows, at least while the bellows is being compressed, thereby determining a maximum compression stroke of the bellows, the adjustment member being fixed on the device in such a manner that an axial portion of said stop surface can be modified prior to compressing the bellows.

44. A device according to claim 43, wherein the abutment-forming surface is defined by a portion of the device.

45. A device according to claim 44, wherein said abutment-forming surface is defined by a transverse wall of a receptacle.

46. A device according to claim 44, wherein said abutment-forming surface is situated inside a receptacle.

47. A device according to claim 46, wherein the adjustment member has an extension extending inside the bellows, suitable for bearing against said abutment-forming surface when the bellows is compressed.

48. A device according to claim 47, wherein said extension is constituted by a bottom portion of an inner sealing skirt bearing in leakproof manner against the neck of the receptacle.

49. A device according to claim 45, wherein said abutment-forming surface is defined by a transverse wall to which the bellows connects.

50. A device according to claim 2, wherein said abutment-forming surface is defined by a transverse wall of the receptacle.

51. A device according to claim 2, wherein said abutment-forming surface is situated inside the receptacle.

52. A device according to claim 51, wherein the adjustment member has an extension extending inside the bellows, suitable for bearing against said abutment-forming surface when the bellows is compressed.

53. A device according to claim 52, wherein said extension is constituted by a bottom portion of an inner sealing skirt bearing in leakproof manner against the neck of the receptacle.

* * * * *